US006436583B1

(12) United States Patent
Mikhaylik

(10) Patent No.: US 6,436,583 B1
(45) Date of Patent: Aug. 20, 2002

(54) STORAGE LIFE ENHANCEMENT IN LITHIUM-SULFUR BATTERIES

(75) Inventor: Yuriy V. Mikhaylik, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 183 days.

(21) Appl. No.: 09/632,698

(22) Filed: Aug. 4, 2000

(51) Int. Cl.$^7$ ............................................... H01M 10/40
(52) U.S. Cl. ....................... 429/340; 429/324; 429/326
(58) Field of Search ................................ 429/324, 340, 429/326

(56) References Cited

U.S. PATENT DOCUMENTS

| | | | |
|---|---|---|---|
| 3,844,837 A | * 10/1974 | Bennion | ........................ 136/6 |
| 3,945,848 A | * 3/1976 | Dey | ............................ 136/100 |
| 4,060,674 A | * 11/1977 | Klemann | ..................... 429/194 |
| 4,104,451 A | * 8/1978 | Klemann | ..................... 429/194 |
| 4,195,123 A | 3/1980 | Jumel | |
| 4,326,014 A | 4/1982 | Dey | |
| 4,410,609 A | 10/1983 | Peled et al. | |
| 4,664,991 A | 5/1987 | Perichaud et al. | |
| 4,739,018 A | 4/1988 | Armand et al. | |
| 4,833,048 A | 5/1989 | De Jonghe et al. | |
| 4,917,974 A | 4/1990 | De Jonghe et al. | |
| 5,162,175 A | 11/1992 | Visco et al. | |
| 5,194,341 A | 3/1993 | Bagley et al. | |
| 5,324,599 A | 6/1994 | Oyama et al. | |
| 5,443,930 A | 8/1995 | Shoji et al. | |
| 5,516,598 A | 5/1996 | Visco et al. | |
| 5,529,860 A | 6/1996 | Skotheim et al. | |
| 5,538,812 A | 7/1996 | Lee et al. | |
| 5,601,947 A | 2/1997 | Skotheim et al. | |
| 5,648,011 A | * 7/1997 | Blonsky | .................... 252/62.2 |
| 5,690,702 A | 11/1997 | Skotheim et al. | |
| 5,723,230 A | 3/1998 | Naoi et al. | |
| 5,783,330 A | 7/1998 | Naoi et al. | |
| 5,792,575 A | 8/1998 | Naoi et al. | |
| 5,882,819 A | 3/1999 | Naoi et al. | |
| 5,935,724 A | 8/1999 | Spillman et al. | |
| 5,935,728 A | 8/1999 | Spillman et al. | |
| 6,117,590 A | 9/2000 | Skotheim et al. | |
| 6,190,426 B1 | 2/2001 | Thibault et al. | |
| 6,201,100 B1 | 3/2001 | Gorkovenko et al. | |

FOREIGN PATENT DOCUMENTS

| | | | |
|---|---|---|---|
| JP | 08-321312 | 12/1996 | |
| JP | 411016603 A | * 1/1999 | .......... H01M/10/40 |
| WO | WO99/33125 | 7/1999 | |

OTHER PUBLICATIONS

Yamin et al., "Electrochemistry of a Nonaqueous Lithium/Sulfur Cell", *J. Power Sources*, vol. 9, pp. 281–287 (1983).

Alamgir et al. "Room Temperature Polymer Electrolytes", *Lithium Batteries*, New Materials, Developments and Perspectives, Chapter 3, pp. 93–136, Elsevier, Amsterdam (1994).

Dominey. "Current State of the Art on Lithium Battery Electrolytes", *Lithium Batteries*, New Materials, Developments and Perspectives, Chapter 4, pp. 137–165, Elsevier, Amsterdam (1994).

*Handbook of Batteries*, Linden, 2$^{nd}$ edition, 3.5–3.6, McGraw–Hill, New York (1995).

*Handbook of Batteries*, Linden, 2$^{nd}$ edition, 3.18–3.19, McGraw–Hill, New York (1995).

* cited by examiner

Primary Examiner—Patrick Ryan
Assistant Examiner—Mark Ruthkosky
(74) Attorney, Agent, or Firm—Jacqueline M. Nicol; Steven A. Carlson

(57) ABSTRACT

Provided is an electrochemical cell in which the cathode comprises an electroactive sulfur-containing material, the anode comprises lithium, and the electrolyte comprises a lithium salt, a non-aqueous solvent, and a self-discharge inhibiting amount of one or more organic sulfites. Suitable organic sulfites include alkyl sulfite esters. Also are provided methods for increasing the storage life of electrochemical cells.

37 Claims, No Drawings

STORAGE LIFE ENHANCEMENT IN LITHIUM-SULFUR BATTERIES

TECHNICAL FIELD

The present invention relates generally to the field of electrochemical cells. More particularly, this invention pertains to lithium batteries in which the cathode comprises an electroactive sulfur-containing material and the electrolyte comprises components that reduce self-discharge of the lithium battery.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

There has been considerable interest in recent years in developing high energy density batteries with lithium containing anodes. Lithium metal is particularly attractive as the anode active material of electrochemical cells because of its extremely light weight and high energy density, compared for example to anode active materials, such as lithium intercalated carbon anodes, where the presence of non-electroactive materials increases the weight and volume of the anode, and thereby reduces the energy density of the cells. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight.

Various types of cathode materials for the manufacture of thin film alkali-metal batteries are known in the art. Of considerable interest are cathode materials comprising sulfur-sulfur bonds, wherein high energy capacity and rechargeability are achieved by the electrochemical cleavage (via reduction) and reformation (via oxidation) of these bonds. For example, in combination with a lithium anode, elemental sulfur has a theoretical specific capacity of 1680 mAh/g, and sulfur-containing polymers with trisulfide and longer polysulfide groups in the polymers have shown theoretical specific capacities of more than 1200 mAh/g, as for example, described in U.S. patent application Ser. No. 08/995,122 to Gorkovenko et al. of the common assignee (PCT Publication No. WO 99/33130). Examples of sulfur-containing cathode materials disclosed for use in lithium and sodium batteries include, for example, elemental sulfur, organo-sulfur, and carbon-sulfur polymer compositions. Elemental sulfur is an attractive cathode material in alkali-metal batteries owing to its low equivalent weight, low cost, and low toxicity.

It is highly desirable that batteries retain their capacity during prolonged storage under ambient conditions. However, battery storage invariably leads to a loss of charge retention, often termed self-discharge. Factors which influence charge retention, as summarized in Linden, *Handbook of Batteries*, 2$^{nd}$ Edition, pp. 3.18–3.19, McGraw Hill, New York, 1995, include, for example, storage conditions such as temperature, length of storage, cell design, the electrochemical system, and discharge conditions. As self-discharge proceeds at a lower rate at reduced temperatures, refrigerated or low temperature storage extends shelf life and is recommended for some battery systems.

Several approaches have been used to improve battery shelf life. For example, in U.S. Pat. No. 5,443,930 to Shoji et al., the incorporation of fluorinated graphite in a $MnO_2$ cathode of a lithium/$MnO_2$ battery is reported to reduce self-discharge. In U.S. Pat. No. 4,195,123 to Jumel, a lithium battery with improved storage life is described in which the lithium anode surface is alloyed with a metal, such as, for example, lead, tin, antimony, or silver, to prevent selective localized deposition of cathode active material during storage. Dey in U.S. Pat. No. 4,326,014 describes cells having negligible self-discharge on storage at 55° C. for extended periods built from lithium anodes which have been treated with an electrolyte solution containing gases such as $CO_2$, $SO_2$, $O_2$, and $NH_3$. In Japanese Patent Publication No. 08-321312, published Dec. 3, 1996, Kamino et al. report that over 40 different compounds added to electrolyte solvents comprising organic carbonates at 1–20% by volume provide long battery shelf life for lithium/$MnO_2$ batteries.

Several problems with self-discharge properties of alkali metal/elemental sulfur battery cells have been reported. One pertains to alkali-metal sulfides, formed at the positive electrode on discharge, reacting with elemental sulfur to produce polysulfides that are soluble in the electrolyte causing self-discharge and loss of cell capacity.

Despite the various approaches to the reduction of self-discharge and increased shelf life, there still remains a need for improvements, particularly for alkali metal/sulfur batteries with high rate capability.

SUMMARY OF THE INVENTION

The present invention pertains to an electrochemical cell comprising: (i) a cathode comprising an electroactive sulfur-containing material; (ii) an anode comprising lithium; and (iii) a non-aqueous electrolyte interposed between the cathode and the anode, wherein the electrolyte comprises: (a) one or more lithium salts; (b) one or more non-aqueous solvents; and (c) a self-discharge inhibiting amount of one or more organic sulfites; wherein the cell is characterized by delivering or utilizing greater than 60% of the available discharge capacity of the electroactive sulfur-containing material upon initial discharge at a C/10 rate.

Suitable self-discharge inhibiting organic sulfites include, but are not limited to, dimethyl sulfite, diethyl sulfite, dipropyl sulfite, dibutyl sulfite, dicyclohexyl sulfite, ethylene sulfite, propylene sulfite, and butylene sulfite.

Suitable self-discharge inhibiting amounts of organic sulfites range from 0.1% to 10% by volume of the electrolyte. Preferred amounts of organic sulfites range from 0.4 to 7% by volume of the electrolyte. More preferred amounts of organic sulfites range from 0.5 to 5% by volume of the electrolyte.

Examples of suitable electroactive sulfur-containing cathode materials for use in the cathodes of the present invention include elemental sulfur and organic materials comprising both sulfur atoms and carbon atoms. Such electroactive sulfur-containing organic materials may or may not be polymeric, and preferably comprise polysulfide moieties. The anode preferably comprises lithium metal. In preferred embodiments, the electrolyte comprises one or more non-aqueous solvents selected from the group consisting of dimethoxymethane, trimethoxymethane, ethylene glycol dimethyl ether, ethylene glycol diethyl ether, propylene glycol dimethyl ether, tetrahydrofuran, 1,3-dioxolane, 1,4-dioxane, and glymes, and one or more lithium salts selected from the group consisting of LiBr, LiI, LiSCN, LiBF$_4$, LiPF$_6$, LiAsF$_6$, LiSO$_3$CF$_3$, LiN(SO$_2$CF$_3$)$_2$, and LiC(SO$_2$CF$_3$)$_3$.

In one embodiment, the cell is a primary cell. In one embodiment, the cell is a secondary cell.

In another aspect of the present invention, a method is provided for increasing the storage life of an electrochemical cell comprising the steps of: (a) providing a cathode comprising an electroactive sulfur-containing material; (b) providing an anode comprising lithium; and (c) providing a non-aqueous electrolyte interposed between the cathode and the anode, wherein the electrolyte comprises: (i) one or more lithium salts; (ii) one or more non-aqueous solvents; and (iii) a self-discharge inhibiting amount of one or more organic sulfites; wherein the cell is characterized by delivering or utilizing greater than 60% of the available discharge capacity of the electroactive sulfur-containing material upon initial discharge at a C/10 rate. In one embodiment, the increased storage life of the cell occurs prior to discharge, such as initial discharge, of the cell.

DETAILED DESCRIPTION OF THE INVENTION

One aspect of the present invention pertains to an electrochemical cell in which the cathode comprises an electroactive sulfur-containing material, the anode comprises lithium, and the non-aqueous electrolyte comprises a self-discharge inhibiting amount of organic sulfites wherein the cell is characterized by delivering or utilizing greater than 60% of the available discharge capacity of the electroactive sulfur-containing material upon initial discharge at a C/10 rate.

The term "self-discharge," as used herein, pertains to the difference between the initial discharge capacity of a cell and the discharge capacity after storage.

$$\text{Self-discharge (\%)} = \frac{C - C^1}{C} \times 100\%,$$

where C is the initial discharge capacity of the cell (mAh) and C$_1$ is the discharge capacity of the cell after storage (mAh).

The terms "C/10", "C/5", or "C rate," as used herein, describe the discharge or the charge current of a cell expressed in terms of the rated capacity of the cell. The "C rate" is described, for example, by Linden in *Handbook of Batteries*, 1995, 2$^{nd}$ Edition, pp. 3.5–3.6, McGraw-Hill, New York.

In one aspect of the present invention, the electrolyte of the electrochemical cell comprises one or more lithium salts, one or more non-aqueous solvents, and one or more organic sulfites selected from the group consisting of dimethyl sulfite, diethyl sulfite, dipropyl sulfite, diallyl sulfite, dibutyl sulfite, dicyclohexyl sulfite, ethylene sulfite, 1,2-propylene sulfite, 1,3-propylene sulfite, 1,2-butylene sulfite, 1,3-butanediol cyclic sulfite, and 1,4-butylene sulfite. In a preferred embodiment, the one or more organic sulfites comprise ethylene sulfite. In another preferred embodiment, the one or more organic sulfites comprise dimethyl sulfite. Suitable organic sulfites also include aryl sulfite esters including, but not limited to, diphenyl sulfite, ditolyl sulfite, and phenylene sulfite.

In one embodiment of the present invention, the non-aqueous electrolyte comprises 0.1 to 10% by volume of the one or more organic sulfites. In a preferred embodiment, the non-aqueous electrolyte comprises 0.4 to 7% by volume of the one or more organic sulfites. In a more preferred embodiment, the non-aqueous electrolyte comprises 0.5 to 5% by volume of the one or more organic sulfites.

The optimum amount of the one or more organic sulfites will depend on several factors, such as, for example, the specific composition of the electrolyte, the type of the electroactive sulfur-containing material, and the degree of self-discharge inhibition desired.

The rate of self-discharge, for example, the % self-discharge per year, will depend upon storage conditions such as the storage temperature. Self-discharge rates may be estimated by accelerated aging testing at high temperatures and extrapolation to ambient conditions. For example, in U.S. Pat. No. 5,443,930, to Shoji et al., for lithium/MnO$_2$ cells, 60 days storage at 60° C. is stated to be equivalent to 3 years at room temperature. The rates of self-discharge reported by Shoji et al. for lithium/MnO$_2$ cells are less than 1% per year at room temperature. Yamin et al. describe in *J. Power Sources*, 1983, 9, 281–287, for lithium/sulfur batteries at 60° C., in THF-toluene electrolyte solvent mixtures, rates of self-discharge ranging from 1.3 to 5% per month. However, these cells have very low rate capability requiring several weeks to reach full discharge. Cells with such low rate discharge capability can be considered only for primary, non-rechargeable, applications and for applications where very low rates of discharge will suffice. Further examples of Li/sulfur cells with THF/toluene electrolyte solvent are provided in U.S. Pat. No. 4,410,609 to Peled et al. For example, for a cell with a 3:1 ratio of THF/toluene, 2 months were needed to discharge to a capacity cut off of 1.5 V at which point the cell had delivered 90% of the available discharge capacity, or theoretical specific energy of the elemental sulfur in the cell. The initial discharge rate was 0.36 mA/cm$^2$ for the 2.54 cm$^2$ area of the cells, i.e., a discharge current of 2.54 cm$^2$×0.36 mA/cm$^2$=0.91 mA. The available discharge capacity of the sulfur in the cells was 260 mAh, based on the theoretical specific energy or available discharge capacity of elemental sulfur for complete electrochemical utilization being 1680 mAh/g of sulfur. To discharge these cells, for example, to 60% of the capacity or 156 mAh at this current would take 156/0.91 hours, i.e., 171.4 hours. This discharge time corresponds to a discharge rate of approximately C/285, based on dividing 171.4 hours by 0.6. It is reported that the discharge rate significantly decreased over the 2 month discharge period to 15 $\mu$A/cm$^2$ (a current of 38 $\mu$A), so that the actual time to deliver 60% of the capacity for these cells is underestimated in the above calculation and will be considerably slower than C/285. For many applications, such as, for example, cellular phones and laptop computers, the capability to have discharge and charge times of not more than a few hours, such as discharge and charge rates of C/2 to C/10, is needed.

Fresh, undischarged cells of the present invention show self-discharge rates of less than 5% per year at room temperature, more preferably less than 2% per year, and most preferably, self-discharge rates of less than 1% per year at room temperature (RT), while delivering a high utilization upon initial discharge at a high discharge rate. For example, as shown in Table 2, cells comprising elemental sulfur as the electroactive sulfur-containing material, a lithium anode, a non-aqueous electrolyte comprising lithium imide in a dioxolane-dimethoxyethane solvent mixture, and ethylene sulfite as a self-discharge inhibiting additive, have self-discharge rates of much less than 1% per year at room temperature. The open circuit voltage (OCV) of the cells of the present invention show very low rates of voltage loss upon storage in contrast to cells without self-discharge inhibiting additives, as shown in Table 1. The OCV can be considered an indirect measure of the cell capacity. An additional benefit of the self-discharge inhibiting additives is the reduction in cell swelling. As shown in Table 1, cells of the present invention exhibit little if any swelling compared with cells lacking the self-discharge inhibiting additive.

In one embodiment of the present invention, from about 0.05% to 1.0% by weight of one or more components of an electroactive sulfur-containing material are dissolved in the He non-aqueous electrolyte. In one embodiment, from about 0.1% to 0.5% by weight of one or more components of an electroactive sulfur-containing material are dissolved in the non-aqueous electrolyte. The amount of one or more components of an electroactive sulfur-containing material dissolved in the electrolyte will vary depending on the composition of the electroactive sulfur-containing material, on the composition of the electrolyte solvents, the composition of the electrolyte salts, and the concentration of these salts in the electrolyte solvent.

In one aspect of the present invention, the storage life of fresh cells, i.e., those which have not been discharged, is increased by providing in the electrolyte a self-discharge inhibiting amount of one or more organic sulfites. For example, as shown in Example 5 and Table 2, high discharge capacities of 1097 mAh to 1139 mAh are delivered, i.e., 72.6% to 75.4% of the available discharge capacity or theoretical specific energy of the elemental sulfur of 1510 mAh, at a rate of discharge of C/8 for cells containing 1.5% by volume of ethylene sulfite in the electrolyte, after storage from 1 to 10 months. In Example 6, with a discharge capacity of 1000 mAh, 66% of the available discharge capacity of 1510 mAh is obtained at a C/5 discharge rate for cells stored under more severe storage conditions. The present invention achieves a low rate of self-discharge while at the same time possessing high discharge rate capability for Li/S cells in contrast to the Li/S cells in U.S. Pat. No. 4,410,609 to Peled et al. which achieve low self-discharge rates but only in cells capable of very low discharge rates and not having a high discharge rate capability. The self-discharge inhibiting organic sulfites of the present invention are particularly effective in fresh cells but may be removed by reaction with polysulfides produced during cell discharge.

While not wishing to be bound by any theory, it is believed that self-discharge is caused by migration of cathode components to the anode of the cells of the present invention. At the anode, these components are reduced while the anode is simultaneously oxidized. For example, in the cells of the present invention, one or more components of the sulfur-containing electroactive materials in the cathode may dissolve in the electrolyte and migrate to the anode comprising lithium. At the anode, the one or more components of the sulfur-containing electroactive materials may be reduced and the lithium anode oxidized. In the cells of the present invention having cathodes comprising elemental sulfur, for example, small amounts of sulfur may dissolve in the electrolyte and migrate to the anode comprising lithium and be reduced to polysulfide ions. The polysulfide ions generated in the self-discharge are quite soluble in typical electrolytes and may be further reduced at the anode creating additional self-discharge.

While not wishing to be bound by any theory, it is believed that the electrolyte self-discharge inhibiting additives of the present invention may form a SEI (solid electrolyte interface) on the lithium surface which inhibits or slows reaction with cathode or other components dissolved in the electrolyte. For example, in the cathodes of the present invention comprising elemental sulfur, self-discharge may be inhibited by a SEI formed by the self-discharge inhibiting additive at the anode surface by inhibiting reaction between sulfur dissolved in the electrolyte and the anode comprising lithium. The self-discharge inhibiting sulfite ester additives of the present invention may further slow or inhibit self-discharge by reaction with polysulfides dissolved in the electrolyte. It has been found that sulfite esters readily react with polysulfide ions as described in Example 7.

The self-discharge inhibiting organic sulfite additives of the present invention may be used in both primary or secondary cells.

Electrolytes

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or solid polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes, as are known in the art. Examples of non-aqueous electrolytes for lithium batteries are described by Dominey in *Lithium Batteries, New Materials, Developments and Perspectives,* Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives,* Chapter 3, pp. 93–136, Elsevier, Amsterdam (1994).

Examples of useful liquid electrolyte solvents include, but are not limited to, non-aqueous organic solvents, such as, for example, N-methyl acetamide, acetonitrile, acetals, ketals, esters, carbonates, sulfones, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

Preferred liquid electrolyte solvents for use in the present invention include, but are not limited to, dimethoxymethane, trimethoxymethane, ethylene glycol dimethyl ether, ethylene glycol diethyl ether, propylene glycol dimethyl ether, tetrahydrofuran, 1,3-dioxolane, 1,4-dioxane, and glymes.

These liquid electrolyte solvents are themselves useful as plasticizers for gel polymer electrolytes. Examples of useful gel polymer electrolyte materials include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes (such as, for example, NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Examples of useful solid polymer electrolyte materials include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. These solid polymer electrolyte materials may contain a liquid electrolyte solvent, typically at a level of less than 20% by volume of the total electrolyte.

Ionic electrolyte salts are added to the electrolyte to increase the ionic conductivity. Examples of ionic electrolyte salts for use in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts useful in the practice of this invention include those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, and LiC(SO$_2$CF$_3$)$_3$.

The self-discharge inhibiting organic sulfites of the present invention may be added to the electrolyte solvents either before addition of the electrolyte salts or after addition of the electrolyte salts.

Cathodes

The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials, include, but are not limited to, elemental sulfur and organic materials comprising both sulfur atoms and carbon atoms, which may or may not be polymeric. Suitable organic materials include those further comprising heteroatoms, conductive polymer segments, composites and conductive polymers.

In one preferred embodiment, the electroactive sulfur-containing material comprises elemental sulfur. In one preferred embodiment, the electroactive sulfur-containing material comprises a mixture of elemental sulfur and a sulfur-containing polymer.

In another embodiment, the sulfur-containing material, in its oxidized form, comprises a sulfur-containing polymer comprising a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3, such as, for example, described in U.S. Pat. Nos. 5,601,947; 5,690,702; 5,529,860 to Skotheim et al.; U.S. patent application Ser. No. 08/995,122 to Gorkovenko et al.; Ser. No. 09/033,218 to Skotheim et al; Ser. No. 09/565,187 to Movchan et al.; and Ser. No. 09/565,184 to Kovalev et al., all of the common assignee, and incorporated herein by reference in their entirety. Other suitable electroactive sulfur-containing materials comprising polysulfide linkages include, but are not limited to, those described in U.S. Pat. No. 4,664,991 to Perichaud et al., and in U.S. Pat. Nos. 5,723,230; 5,783,330; 5,792,575; and 5,882,819 to Naoi et al.

In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing polymer has a polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Preferably, the electroactive sulfur-containing material comprises greater than 50% by weight of sulfur. More preferably, the electroactive sulfur-containing material comprises greater than 75% by weight of sulfur, and most preferably, the electroactive sulfur-containing material comprises greater than 90% by weight of sulfur.

The electroactive sulfur-containing cathodes of the present invention may further comprise electroactive metal chalcogenides, electroactive conductive polymers, and combinations thereof.

The cathodes of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight.

The cathodes of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides (PVF$_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight.

The cathodes of the present invention may further comprise a current collector. These current collectors are useful in efficiently collecting the electrical current generated throughout the cathodes, and in providing an efficient surface for attachment of the electrical contacts leading to the external circuit as well as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the present invention may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of cathodes of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components may be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions may be applied to substrates by any of a variety of well-known coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying.

The method of preparing the cathodes of the present invention may further comprise heating the electroactive sulfur-containing material to a temperature above its melting point and then resolidifying the melted electroactive sulfur-containing material to form a cathode active layer having redistributed sulfur-containing material of higher volumetric density than before the melting process.

Anodes

Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys.

Separators

The electrochemical cells of the present invention may further comprise a separator interposed between the cathode and anode. Typically, the separator is a solid non-conductive or insulative material which separates or insulates the anode and the cathode from each other and which permits the transport of ions between the anode and the cathode.

The pores of the separator may be partially or substantially filled with electrolyte. Separators may be supplied as porous free standing films which are interleaved with the anodes and the cathodes in the fabrication of electric current producing cells. Alternatively, the porous separator layer may be applied directly to the surface of one of the electrodes, for example, as described in PCT Publication No. WO 99/33125 to Carlson et al of the common assignee, and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in PCT Publication No. WO 99/33125, by Carlson et al. of the common assignee. Solid polymer electrolytes and gel polymer electrolytes may also function as a separator in addition to their electrolyte function.

In one embodiment, the solid porous separator is a porous polyolefin separator. In one embodiment, the solid porous separator comprises a microporous xerogel layer, such as, for example, a microporous pseudo-boehmite layer.

Cells and Batteries

The anodes, cathodes, and electrolytes of the present invention may be assembled into cells or batteries by any of the methods known to those skilled in the art, such as, for example, winding or stacking. Cells or batteries of the present invention may be made in a variety of sizes and configurations which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight, thin film barrier materials are particularly preferred, e.g. foils, etc. For example, U.S. patent application Ser. No. 09/215,030 to Thibault et al. of the common assignee describes methods for preparing prismatic cells in which suitable barrier materials for sealed casing, methods of filling cells with electrolyte, and methods of sealing the casing, are described. With thin film electrodes when configured into prismatic designs, it is important that the electrodes possess dimensional stability. For example, it is important that there is minimal swelling in the cells during storage prior to discharge of the cells. It has been found that the cells and methods of the present invention lead to minimal changes in cell thickness during storage of cells, as shown in Tables 1 and 2. The swelling in the cells may be a result of dimensional changes in the electrodes and also may be a result of the formation of gases from traces of water in the cell components reacting with metallic lithium or from the formation of gaseous species, such as low boiling hydrocarbons, from reactions of lithium with electrolyte solvents.

EXAMPLES

Several embodiments of the present invention are described in the following examples, which are offered by way of illustration and not by way of limitation.

Comparative Example 1

A cathode was prepared by coating a mixture of 75 parts of elemental sulfur (available from Aldrich Chemical Company, Milwaukee, Wis.), 15 parts of a conductive carbon pigment PRINTEX XE-2 (a trademark for a carbon pigment available from Degussa Corporation, Akron, Ohio), and 10 parts of PYROGRAF-III (a tradename for carbon filaments available from Applied Sciences, Inc., Cedarville, Ohio) dispersed in isopropanol onto a 17 micron thick conductive carbon coated aluminum foil substrate (Product No. 60303 available from Rexam Graphics, South Hadley, Mass.). After drying, the coated cathode active layer thickness was about 30 microns and the loading of sulfur in the cathode active layer was 1.07 mg/cm$^2$. The anode was lithium foil of about 50 microns in thickness. The electrolyte was a 1.4 M solution of lithium bis(trifluoromethylsulfonyl) imide, (lithium imide, available from 3M Corporation, St. Paul, Minn.) in a 40:55:5 volume ratio mixture of 1,3-dioxolane, dimethoxyethane, and tetraethyleneglycol divinylether. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.).

The above components were combined into a layered structure of cathode/separator/anode, which was wound and compressed, with the liquid electrolyte (approximately 4 g) filling the void areas of the separator and cathode to form prismatic cells with an electrode area of about 840 cm$^2$. The sulfur content of the cell was 0.9 g, equivalent to 1510 mAh capacity (1680 mAh/g×0.9 g). After sealing the cells in a foil pouch, they were subjected to storage tests, open circuit voltage (OCV), and thickness measurements, as reported in Table 1.

Example 1

Cells were prepared by the method of Comparative Example 1 except that ethylene sulfite was added to the electrolyte to give a concentration of 0.1% by volume of the electrolyte. Storage test results of thickness and OCV measurements are collected in Table 1.

Example 2

Cells were prepared by the method of Comparative Example 1 except that ethylene sulfite was added to the electrolyte to give a concentration of 0.5% by volume of the electrolyte. Storage test results of thickness and OCV measurements are collected in Table 1.

Example 3

Cells were prepared by the method of Comparative Example 1 except that ethylene sulfite was added to the electrolyte to give a concentration of 1% by volume of the electrolyte. Storage test results of thickness and OCV measurements are collected in Table 1.

Example 4

Cells were prepared by the method of Comparative Example 1 except that ethylene sulfite was added to the electrolyte to give a concentration of 5% by volume of the electrolyte. Storage test results of thickness and OCV measurements are collected in Table 1.

TABLE 1

Storage Test Data

| Example | Time, Temp. | Additive (by vol.) | OCV | Thickness (mm) |
|---|---|---|---|---|
| Comparative Example 1 | 0 | 0 | 2.99 V | 5.65 |
| Comparative Example 1 | 3 days, RT | 0 | 2.21 V | 12.78 |
| Comparative Example 1 | 14 days, 60° C. | 0 | 2.18 V | 13.88 |
| Example 1 | 0 | 0.1% | 3.00 V | 5.66 |
| Example 1 | 3 days, RT | 0.1% | 2.25 V | 9.90 |
| Example 1 | 14 days, 60° C. | 0.1% | 2.18 V | 12.11 |
| Example 2 | 0 | 0.5% | 3.04 V | 5.65 |
| Example 2 | 3 days, RT | 0.5% | 2.82 V | 6.25 |
| Example 2 | 14 days, 60° C. | 0.5% | 2.22 V | 10.50 |
| Example 3 | 0 | 1% | 3.05 V | 5.66 |
| Example 3 | 3 days, RT | 1% | 2.87 V | 6.18 |
| Example 3 | 14 days, 60° C. | 1% | 2.88 V | 6.22 |
| Example 4 | 3 days, RT | 5% | N/A | 6.2 |
| Example 4 | 14 days, 60° C. | 5% | 2.9 V | 6.2 |

Example 5

Cells were prepared by the method of Comparative Example 1 except that the electrolyte was a 1.4 M solution of lithium bis(trifluoromethylsulfonyl)imide in a 42:58 volume ratio mixture of 1,3-dioxolane and dimethoxyethane, and ethylene sulfite was added to the electrolyte to give a concentration of 1.5% by volume of the electrolyte. Storage test results of thickness and discharge capacity measurements to 1.5 V at a current of 0.15 A, a C/8 rate, are collected in Table 2. Complete discharge of the cells was performed in 8 hours. Without the self-discharge additive of the present invention, cells with the electrolyte of this Example typically lose at least 25% of their discharge capacity in one month at room temperature and increase thickness by more than 100%. Storage for periods longer than one month at room temperature is unsafe due to excessive swelling.

TABLE 2

Storage Test Data, Cells of Example 5 at Room Temperature

| Storage Time | Discharge Capacity, 1$^{st}$ Cycle | Thickness (mm) |
|---|---|---|
| 0 | 1097 mAh | 5.98 |
| 1 month | 1097 mAh | 6.23 |
| 2 months | 1091 mAh | 6.22 |
| 4 months | 1111 mAh | 6.03 |
| 6 months | 1133 mAh | 6.14 |
| 10 months | 1139 mAh | 6.12 |

In a 1.4 M solution of lithium bis(trifluoromethylsulfonyl) imide in a 42:58 volume ratio mixture of 1,3-dioxolane and dimethoxyethane, the solubility of sulfur was found to be 0.4% by weight at 25° C.

Example 6

The cells of Example 3 (an electrolyte comprising 1% by volume of ethylene sulfite) were stored at 60° C. for 2 weeks followed by storage for 6 weeks at room temperature. Discharge of the cells at 0.2 A, C/5 rate, gave a discharge capacity of 1000 mAh.

Example 7

Reaction of ethylene sulfite with lithium polysulfide.

To a stirred solution of Li$_2$S$_8$ (6.96 g) in dimethoxyethane (DME) (36 mL), ethylene sulfite (5.7 g) was added dropwise at room temperature. As the addition proceeded, a yellow solid was formed. After continuing to stir at room temperature for 2 hours, the yellow solid was separated by filtration, washed with DME, and dried under vacuum. The yield of dried solid was 10.3 g (81%). The infrared spectrum of the product showed the absence of the peak at 1200 cm$^{-1}$ (S=O) of the ethylene sulfite. This example shows that ethylene sulfite reacts readily with lithium polysulfide ions.

Example 8

In the bottom of a bottle was placed dried powdered sulfur (2 g), and a solution of lithium bis(trifluoromethylsulfonyl) imide (lithium imide) in dioxolane (25 mL) was placed over the sulfur. Ethylene sulfite was added by syringe to the liquid. A strip of lithium foil, 10 cm in length, was suspended in the liquid, but not in contact with the solid sulfur. The bottle was sealed and held at 60° C. in an oven. Table 3 summarizes the results of visual observation, after 7 days and again after 15 weeks, of bottles with various concentrations of lithium imide and ethylene sulfite. Bottles without ethylene sulfite developed a deep red color from the reduction of sulfur dissolved in the electrolyte to polysulfide ions by the lithium foil. Bottles containing ethylene sulfite remained colorless showing the absence of sulfur reduction by the lithium foil. The solubility of sulfur in dioxolane was found to be 0.8% by weight at 25° C. and is estimated to be approximately 0.4% to 0.5% by weight in 0.5 M lithium imide in dioxolane.

TABLE 3

Lithium-Sulfur Interaction

| Lithium Imide Concentration | Ethylene Sulfite % by Volume | Time at 60° C. | Observation |
|---|---|---|---|
| 0.5 M | 0% | 7 Days | Deep Red Color |
| 0.5 M | 1% | 15 Weeks | Colorless |
| 0.3 M | 0% | 7 Days | Deep Red Color |
| 0.3 M | 1% | 15 Weeks | Colorless |
| 0.3 M | 2.5% | 15 Weeks | Colorless |

While the invention has been described in detail and with reference to specific embodiments thereof, it will be apparent to one skilled in the art that various changes and modifications can be made without departing from the spirit and scope thereof

What is claimed is:

1. An electrochemical cell comprising:
   (i) a cathode comprising an electroactive sulfur-containing material;
   (ii) an anode comprising lithium; and
   (iii) a non-aqueous electrolyte interposed between said cathode and said anode, said electrolyte comprising:
      (a) one or more lithium salts;
      (b) one or more non-aqueous solvents; and
      (c) a self-discharge inhibiting amount of one or more organic sulfites;
   wherein said cell is characterized by delivering greater than 60% of the available discharge capacity of said electroactive sulfur-containing material upon initial discharge at a C/10 rate.

2. The cell of claim 1, wherein said cell is characterized by delivering greater than 70% of the available discharge capacity of said electroactive sulfur-containing material upon initial discharge at a C/10 rate.

3. The cell of claim 1, wherein one or more components of said electroactive sulfur-containing material are dissolved in said non-aqueous electrolyte in the amount of from 0.05 to 1% by weight.

4. The cell of claim 1, wherein one or more components of said electroactive sulfur-containing material are dissolved in said non-aqueous electrolyte in the amount of from 0.1 to 0.5% by weight.

5. The cell of claim 1, wherein said one or more organic sulfites are selected from the group consisting of dimethyl sulfite, diethyl sulfite, dipropyl sulfite, dibutyl sulfite, dicyclohexyl sulfite, ethylene sulfite, propylene sulfite, and butylene sulfite.

6. The cell of claim 5, wherein said one or more organic sulfites comprise ethylene sulfite.

7. The cell of claim 5, wherein said one or more organic sulfites comprise dimethyl sulfite.

8. The cell of claim 1, wherein said non-aqueous electrolyte comprises 0.1 to 10% by volume of said one or more organic sulfites.

9. The cell of claim 1, wherein said non-aqueous electrolyte comprises 0.4 to 7% by volume of said one or more organic sulfites.

10. The cell of claim 1, wherein said non-aqueous electrolyte comprises 0.5 to 5% by volume of said one or more organic sulfites.

11. The cell of claim 1, wherein said one or more non-aqueous solvents are selected from the group consisting of dimethoxymethane, trimethoxymethane, ethylene glycol dimethyl ether, ethylene glycol diethyl ether, propylene glycol dimethyl ether, tetrahydrofuran, 1,3-dioxolane, 1,4-dioxane, and glymes.

12. The cell of claim 1, wherein said electroactive sulfur-containing material comprises elemental sulfur.

13. The cell of claim 1, wherein said electroactive sulfur-containing material comprises a sulfur-containing polymer material which, in its oxidized state, comprises a polysulfide moiety of the formula, —$S_m$—, selected from the group consisting of covalent —$S_m$— moieties, ionic —$S_m^-$ moieties, and ionic $S_m^{2-}$ moieties, wherein m is an integer greater than 3.

14. The cell of claim 13, wherein m of said polysulfide moiety, —$S_m$—, is an integer equal to or greater than 6.

15. The cell of claim 13, wherein the polymer backbone chain of said sulfur-containing polymer material comprises conjugated segments.

16. The cell of claim 13, wherein said polysulfide moiety, —$S_m$—, is covalently bonded by one or both of its terminal sulfur atoms on a side group to the polymer backbone chain of said sulfur-containing polymer material.

17. The cell of claim 13, wherein said polysulfide moiety, —$S_m$—, is incorporated into the polymer backbone chain of said sulfur-containing polymer material by covalent bonding of said polysulfide moiety's terminal sulfur atoms.

18. The cell of claim 13, wherein said sulfur-containing polymer material comprises greater than 75 weight percent of sulfur.

19. The cell of claim 1, wherein said one or more lithium salts are selected from the group consisting of LiBr, LiI, LiSCN, LiBF$_4$, LiPF$_6$, LiAsF$_6$, LiCF$_3$SO$_3$, LiN(CF$_3$SO$_2$)$_2$, LiN(CF$_3$CF$_2$SO$_2$)$_2$, and LiC(SO$_2$CF$_3$)$_3$.

20. The cell of claim 1, wherein said one or more lithium salts comprises lithium bis(trifluoromethylsulfonyl)imide.

21. The cell of claim 1, wherein said anode comprising lithium is selected from the group consisting of lithium metal, lithium-aluminum alloys, lithium-tin alloys, lithium-intercalated carbons, and lithium-intercalated graphites.

22. The cell of claim 1, wherein said cell is a primary cell.

23. The cell of claim 1, wherein said cell is a secondary cell.

24. A method of increasing the storage life of an electrochemical cell comprising the steps of:
   (a) providing a cathode comprising an electroactive sulfur-containing material;

(b) providing an anode comprising lithium; and
(c) providing a non-aqueous electrolyte interposed between said cathode and said anode, wherein said electrolyte comprises:
   (i) one or more lithium salts;
   (ii) one or more non-aqueous solvents; and
   (iii) a self-discharge inhibiting amount of one or more organic sulfites; wherein said cell is characterized by delivering greater than 60% of the available discharge capacity of said electroactive sulfur-containing material upon initial discharge at a C/10 rate.

25. The method of claim 24, wherein said increased storage life of said cell occurs prior to discharge of said cell.

26. The method of claim 24, wherein one or more components of said electroactive sulfur-containing material are dissolved in said non-aqueous electrolyte in the amount of from 0.05 to 1% by weight.

27. The method of claim 24, wherein one or more components of said electroactive sulfur-containing material are dissolved in said non-aqueous electrolyte in the amount of from 0.1 to 0.5% by weight.

28. The method of claim 24, wherein said one or more organic sulfites are selected from the group consisting of dimethyl sulfite, diethyl sulfite, dipropyl sulfite, dibutyl sulfite, dicyclohexyl sulfite, ethylene sulfite, propylene sulfite, and butylene sulfite.

29. The method of claim 28, wherein said one or more organic sulfites comprise ethylene sulfite.

30. The method of claim 28, wherein said one or more organic sulfites comprise dimethyl sulfite.

31. The method of claim 24, wherein said non-aqueous electrolyte comprises 0.1 to 10% by volume of said one or more organic sulfites.

32. The method of claim 24, wherein said non-aqueous electrolyte comprises 0.4 to 7% by volume of said one or more organic sulfites.

33. The method of claim 24, wherein said non-aqueous electrolyte comprises 0.5 to 5% by volume of said one or more organic sulfites.

34. The method of claim 24, wherein said one or more non-aqueous solvents are selected from the group consisting of dimethoxymethane, trimethoxymethane, ethylene glycol dimethyl ether, ethylene glycol diethyl ether, propylene glycol dimethyl ether, tetrahydrofuran, 1,3-dioxolane, 1,4-dioxane, and glymes.

35. The method of claim 24, wherein said electroactive sulfur-containing material comprises elemental sulfur.

36. The method of claim 24, wherein said one or more lithium salts are selected from the group consisting of LiBr, LiI, LiSCN, $LiBF_4$, $LiPF_6$, $LiAsF_6$, $LiCF_3SO_3$, $LiN(CF_3SO_2)_2$, $LiN(CF_3CF_2SO_2)_2$, and $LiC(SO_2CF_3)_3$.

37. The method of claim 24, wherein said one or more lithium salts comprises lithium bis(trifluoromethylsulfonyl) imide.

* * * * *